(12) United States Patent
Kim et al.

(10) Patent No.: US 6,751,274 B2
(45) Date of Patent: Jun. 15, 2004

(54) APPARATUS AND METHOD FOR CHANNEL ESTIMATION IN RADIO COMMUNICATION SYSTEM

(75) Inventors: Kyu-Hak Kim, Seoul (KR); Je-Woo Kim, Songnam-shi (KR); Hyung-Suk Kim, Pusan-kwangyeokshi (KR); Ki-Soo Kim, Pusan-kwangyeokshi (KR)

(73) Assignee: Samsung Electronics Co., Ltd. (KR)

( * ) Notice: Subject to any disclaimer, the term of this patent is extended or adjusted under 35 U.S.C. 154(b) by 551 days.

(21) Appl. No.: 09/737,406

(22) Filed: Dec. 15, 2000

(65) Prior Publication Data

US 2001/0006540 A1 Jul. 5, 2001

(30) Foreign Application Priority Data

Dec. 29, 1999 (KR) .............................. 99-65273

(51) Int. Cl.[7] .......................... H04L 1/00; H04L 25/08; H03D 1/04; H03D 1/06; H03K 5/01; H03K 6/04; H04B 1/10

(52) U.S. Cl. ................... 375/346; 375/285; 455/504; 455/506

(58) Field of Search ................. 375/346, 348, 375/285, 284, 278, 229, 230, 231, 232, 233, 324, 340; 455/504, 501, 506, 63, 65, 296

(56) References Cited

U.S. PATENT DOCUMENTS

| 5,274,629 | A | | 12/1993 | Helard et al. | |
|---|---|---|---|---|---|
| 5,748,677 | A | * | 5/1998 | Kumar | 375/285 |
| 5,809,083 | A | * | 9/1998 | Wright | 375/285 |
| 5,875,215 | A | * | 2/1999 | Dobrica | 375/344 |
| 6,085,103 | A | * | 7/2000 | Ramesh et al. | 455/504 |
| 6,510,190 | B1 | * | 1/2003 | Wu et al. | 375/355 |
| 6,519,296 | B1 | * | 2/2003 | Hladik | 375/325 |
| 6,570,935 | B1 | * | 5/2003 | Sugita | 375/324 |
| 6,577,674 | B1 | * | 6/2003 | Ko et al. | 375/148 |

FOREIGN PATENT DOCUMENTS

| EP | 0 715 440 | 6/1996 |
|---|---|---|
| JP | 07-307677 | 11/1995 |
| JP | 08-163005 | 6/1996 |
| JP | 10-190494 | 7/1998 |
| JP | 2001-512644 | 8/2001 |
| WO | WO 98/37644 | 8/1998 |
| WO | WO 99/60721 | 11/1999 |

OTHER PUBLICATIONS

Dong Xiaojian et al., "A Novel Method of Channel Estimation of W–CDMA", Asia–Pacific Conference on Communications and Optoelectronics and Communications Conference, vol. 1, Oct. 18, 1999.

* cited by examiner

Primary Examiner—Phoung Phu
(74) Attorney, Agent, or Firm—Dilworth & Barrese LLP

(57) ABSTRACT

There is provided a channel estimating apparatus and method in a radio communication system. In the channel estimating apparatus, a fading estimator estimates a channel using preset symbols of an input signal, a first interpolator interpolates the other symbols of the input signal based on the fading estimation, a first inverter inverts the output signal of the first interpolator, a first delay delays the input signal for a predetermined time, a first multiplier primarily compensates the output signal of the first delay by means of the output signal of the first inverter, a second interpolator interpolates each symbol of the input signal relating to primarily compensated symbols in a predetermined period before and after the symbol, a level controller controls the level of the output signal of the second interpolator, a second inverter inverts the output signal of the level controller, a second delay for delays the primarily compensated signal for a predetermined time, and a second multiplier secondarily compensates the output signal of the second delay by means of the output signal of the second inverter.

10 Claims, 9 Drawing Sheets

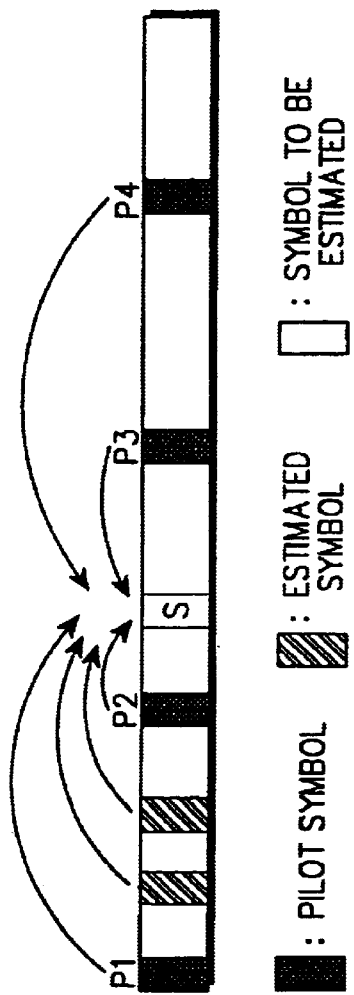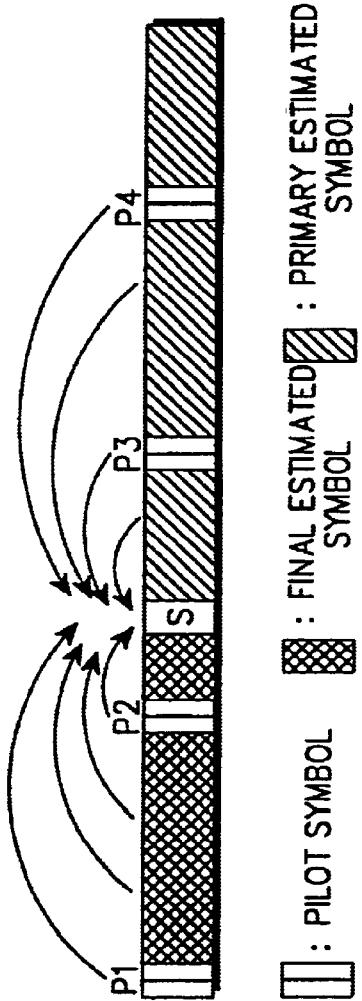

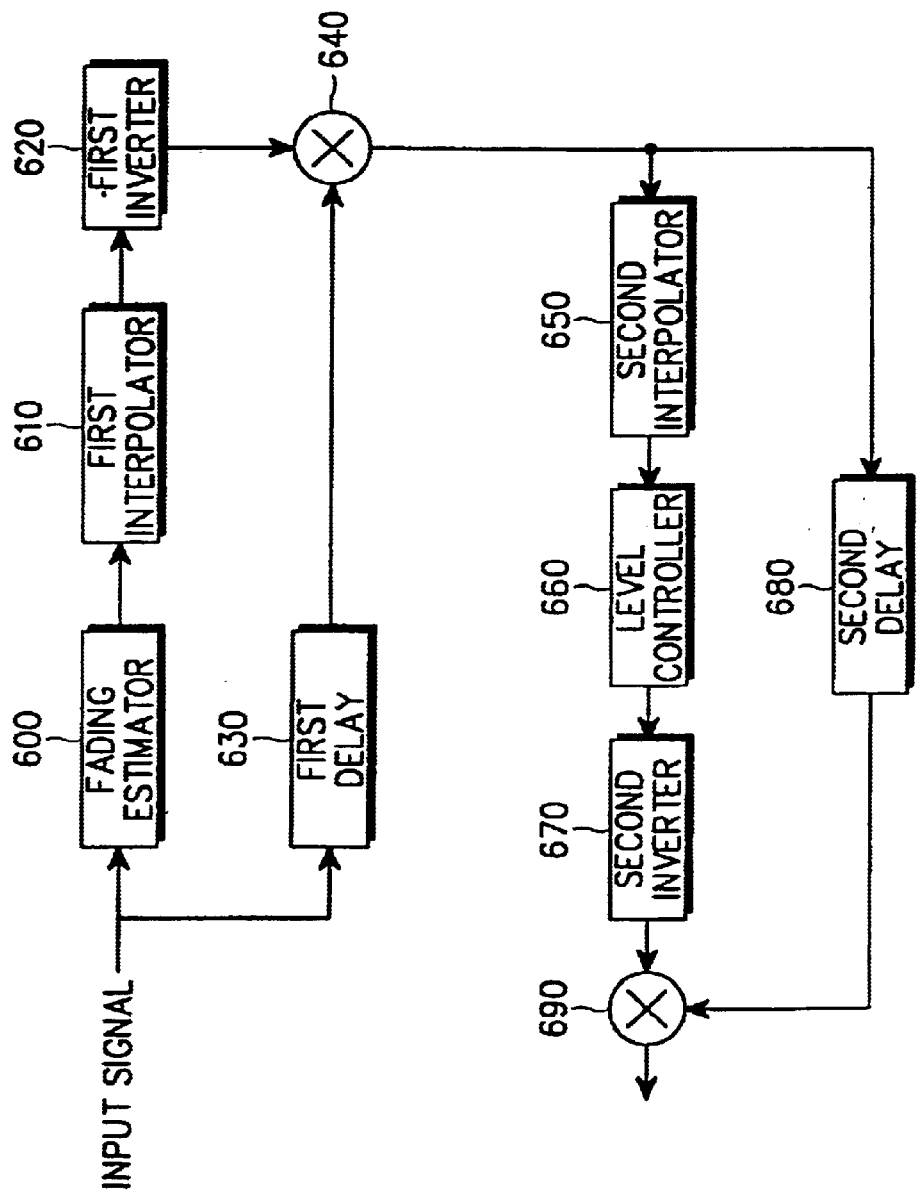

APPARATUS AND METHOD FOR CHANNEL ESTIMATION IN RADIO COMMUNICATION SYSTEM

PRIORITY

This application claims priority to an application entitled "Apparatus and Method for Channel Estimation in Radio Communication System" filed in the Korean Industrial Property Office on Dec. 29, 1999 and assigned Ser. No. 99-65273, the contents of which are hereby incorporated by reference.

BACKGROUND OF THE INVENTION

1. Field of the Invention

The present invention relates generally to data demodulation in a radio communication system, and in particular, to an apparatus and method for demodulating data against signal distortion caused by fading or other factors.

2. Description of the Related Art

Radio communication technology, mainly cellular communication technology has been rapidly developed and GMPCS (Global Mobile Personal Communication System) is being deployed for communication throughout the world. For radio communication systems utilizing satellites, research has actively been conducted on data demodulation because the long distance between a satellite and a mobile station causes severe data distortion due to fading.

In general, predetermined symbols (e.g., pilot symbols) are inserted in one frame prior to transmission and the distortion of other information symbols are compensated for by detecting the distortion of the predetermined symbols. That is, a transmitter inserts agreed symbols between data symbols prior to transmission and a receiver extracts those agreed symbols for use in channel estimation. Conventional channel estimation relies on the use of an interpolator or extended symbol-aided estimation (ESAE).

With respect to prior art systems, FIG. 1 is a schematic block diagram of a conventional channel estimating apparatus in a radio communication system for data recovery. FIG. 2 is the format of a frame used in the conventional radio communication system. FIG. 3 is a detailed block diagram of the conventional channel estimating apparatus in the radio communication system. FIG. 4 is a block diagram of another conventional channel estimating apparatus relying on ESAE in a radio communication system and FIG. 5 conceptually illustrates channel estimation for data recovery relying on the ESAE.

FIG. 1 illustrates a channel estimating apparatus using pilot symbols for channel estimation in a PSAM (Pilot Symbol Assisted Modulation) system. In the PSAM system, pilot symbols are periodically inserted by pilot symbol inserter 101 between data symbols and the entire signal is pulse-shaped by pulse shaper 102 prior to transmission. Fading and AWGN (Additive White Gaussian Noise) are added to the transmission signal by multiplier 103 and adder 104, respectively. A receiver separates an input signal into pilot symbols and data symbols by passing the input signal through a matched filter 105 and estimates the channel of data symbols using the pilot symbols. For the channel estimation, an interpolator 108 is required and data is recovered using the interpolation result. Delay 106 compensates for the signal delay through interpolator 108.

The channel estimation process in a general PSAM system can be expressed briefly as $$St(t)=Re[zO(t)\exp(j2\pi fct)] \tag{1}$$

$$zO(t)=zOi(t)+jzOq(t) \tag{2}$$

where St(t) is the transmitter signal, $Re[zO(t)\exp(j2\pi fct)]$ represents the real number part of $zO(t)\exp(j2\pi fct)$, fc is a carrier frequency, and zO(t) is a transmission baseband signal with its band limited by a transmission filter. As shown in FIG. 2, preset pilot symbols are inserted into a transmission frame. Due to fading, the transmission signal arrives at the receiver as $$Sr(t)=Re[c(t)zO(t)\exp\{j2\pi(fc-fo)t\}+nc(t)\exp\{j2\pi(fc-fo)t\}] \tag{3}$$

where Sr(t) is the received signal, and nc(t) is the AWGN component. A channel complex gain c(t) includes fading and a frequency offset, given by $$c(t)=\exp(j2\pi fot)g(t) \tag{4}$$

where fo is a residual frequency offset and g(t) is the envelope of c(t). Then, a demodulated baseband signal is expressed as $$U(t)=C(t)Z(t)+n(t) \tag{5}$$

It is necessary to estimate C(t) to achieve the baseband signal Z(t). The sampled value of an $m^{th}$ symbol in a $k^{th}$ frame is $$tk, n=\{k+(n/M)\}TP \tag{6}$$

for $k=0, 1, 2, 3, \ldots n=0, 1, 2, 3 \ldots M-1$ where TP, a pilot symbol insertion period, is NT. A pilot symbol demodulated at every frame timing instant is $$U(tk, 0)=C(tk, 0)b+n(tk, 0) \tag{7}$$

An estimated value of fading at the instant when a $k^{th}$ pilot symbol is received is computed by dividing a distorted symbol U(tk, 0) of Eq. (7) by a pilot symbol b. That is, $$C(tk, 0)=u(tk, 0)/b=C(tk, 0)+n(tk, 0)/b \tag{8}$$

Fading-caused distortion of an information symbol can be detected using an interpolator as applied to Eq. (8). There are generally two interpolation methods: fixed interpolation and adaptive interpolation. For fixed interpolation, a sync (Nyquist), Gaussian, linear, or a cubic interpolator is applied throughout a channel to estimate the distortion of the channel regardless of channel variation, whereas for adaptive interpolation, for example, a Wiener interpolator using a Wiener filter accurately estimates a channel by adaptively compensating for channel variation utilizing parameters like Doppler frequency and symbol energy per power spectrum density (Es/No).

FIG. 3 is a conceptual view of the fading estimation and compensation using a sync interpolator. As shown in FIG. 3, for channel estimation, a fading estimator 301 estimates fading of pilot symbols and an interpolator 302 interpolates data symbols based on the channel estimation of the pilot symbols. The channel estimation result is reflected in an input signal delayed by a delay 304, to thereby compensate the input signal.

FIGS. 4 and 5 illustrate the other channel estimation scheme, ESAE. A receiver separates an input signal into pilot symbols and data symbols by passing the input signal through a matched filter 401. For the channel estimation, an interpolator 403 is required and data is recovered using the interpolation result. First delay 402 compensates for the signal delay through interpolator 403. Demodulator 405 demodulates the signal. As shown in FIG. 5, recovered data before a symbol "S" is used along with pilot symbols "P1", "P2", "P3", and "P4" to estimate the channel of the symbol "S".

Despite relative simplicity in channel estimation, the data estimation scheme using pilot symbol channel estimation and the ESAE scheme have shortcomings in that channel estimation is not reliable when a received signal has weak strength or experiences severe fading.

SUMMARY OF THE INVENTION

It is, therefore, an object of the present invention to provide a channel estimating apparatus and method capable of channel estimation even in an environment where fading causes severe distortion.

The above object can be achieved by providing a channel estimating apparatus and method in a radio communication system. In the channel estimating apparatus, a fading estimator estimates a channel using preset symbols of an input signal, a first interpolator interpolates the other symbols of the input signal based on the fading estimation, a first inverter inverts the output signal of the first interpolator, a first delay delays the input signal for a predetermined time, a first multiplier primarily compensates the output signal of the first delay by means of the output signal of the first inverter, a second interpolator interpolates each symbol of the input signal relating to primarily compensated symbols in a predetermined period before and after the symbol, a level controller controls the level of the output signal of the second interpolator, a second inverter inverts the output signal of the level controller, a second delay delays the primarily compensated signal for a predetermined time, and a second multiplier secondarily compensates the output signal of the second delay by means of the output signal of the second inverter.

BRIEF DESCRIPTION OF THE DRAWINGS

The above and other objects, features and advantages of the present invention will become more apparent from the following detailed description when taken in conjunction with the accompanying drawings in which:

FIG. 5 is a conceptual view of channel estimation for data recovery relaying on the ESAE in the radio communication system;

FIG. 6 is a block diagram of a channel estimating apparatus according to an embodiment of the present invention;

FIG. 7 is a conceptual view of channel estimation for data recovery according to the embodiment of the present invention.

DETAILED DESCRIPTION OF THE PREFERRED EMBODIMENT

Figure 1:
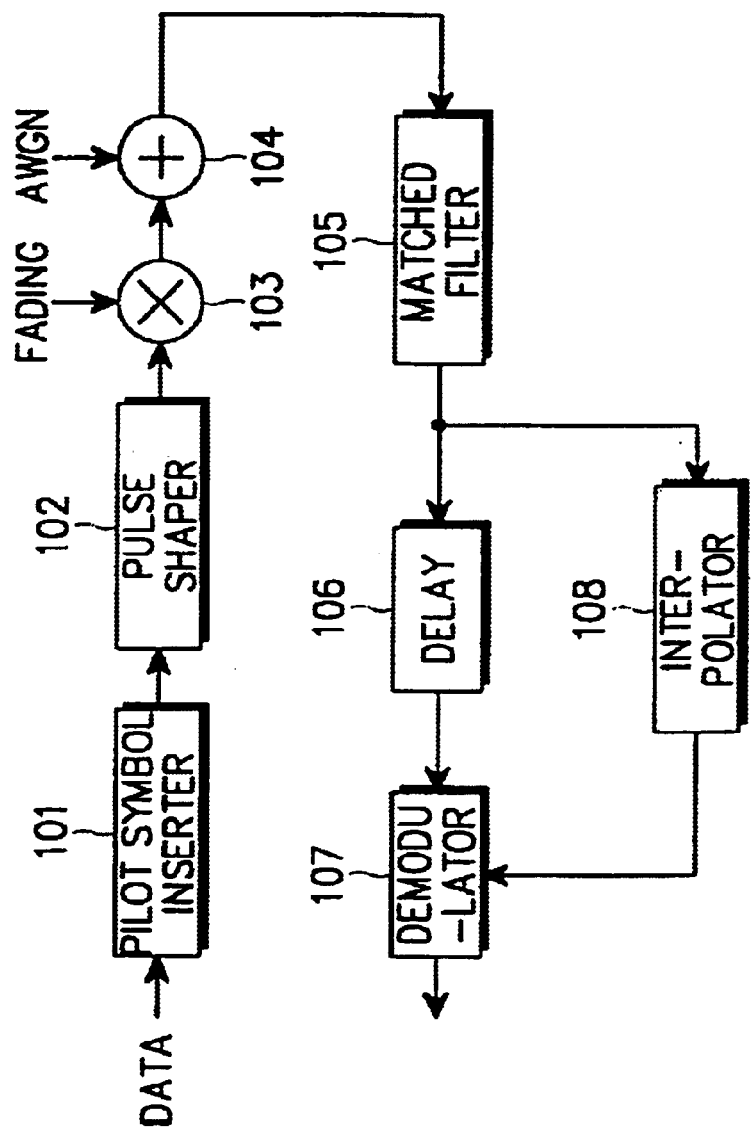
FIG. 1 is a schematic block diagram of a conventional channel estimating apparatus in a radio communication system.
Figure 2:
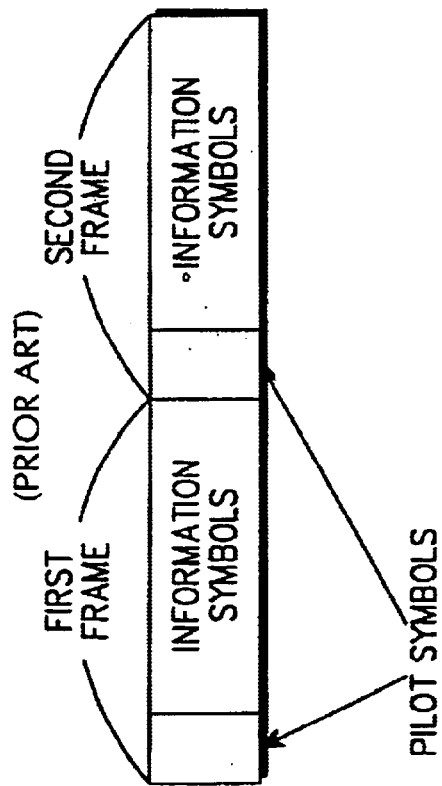
FIG. 2 is the format of a frame used in the conventional radio communication system.
Figure 3:
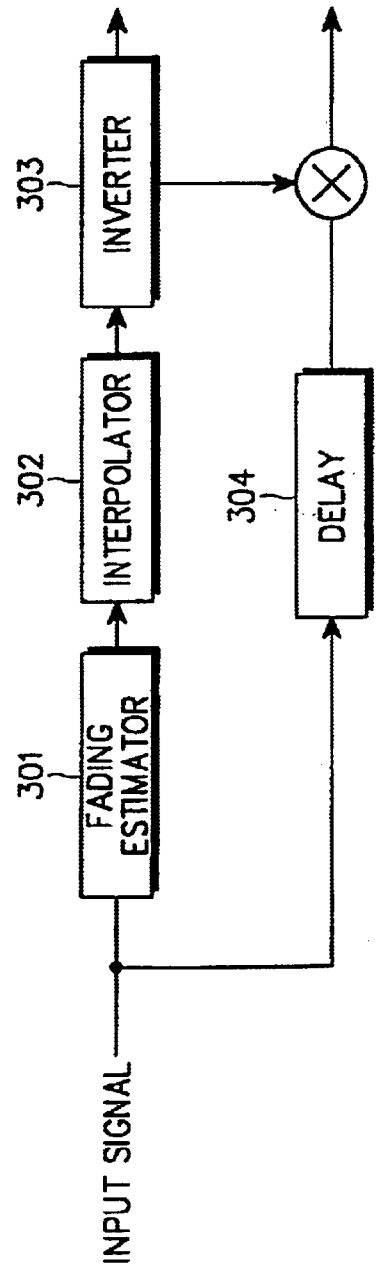
FIG. 3 is a detailed block diagram of the channel estimating apparatus in the conventional radio communication system.
Figure 4:
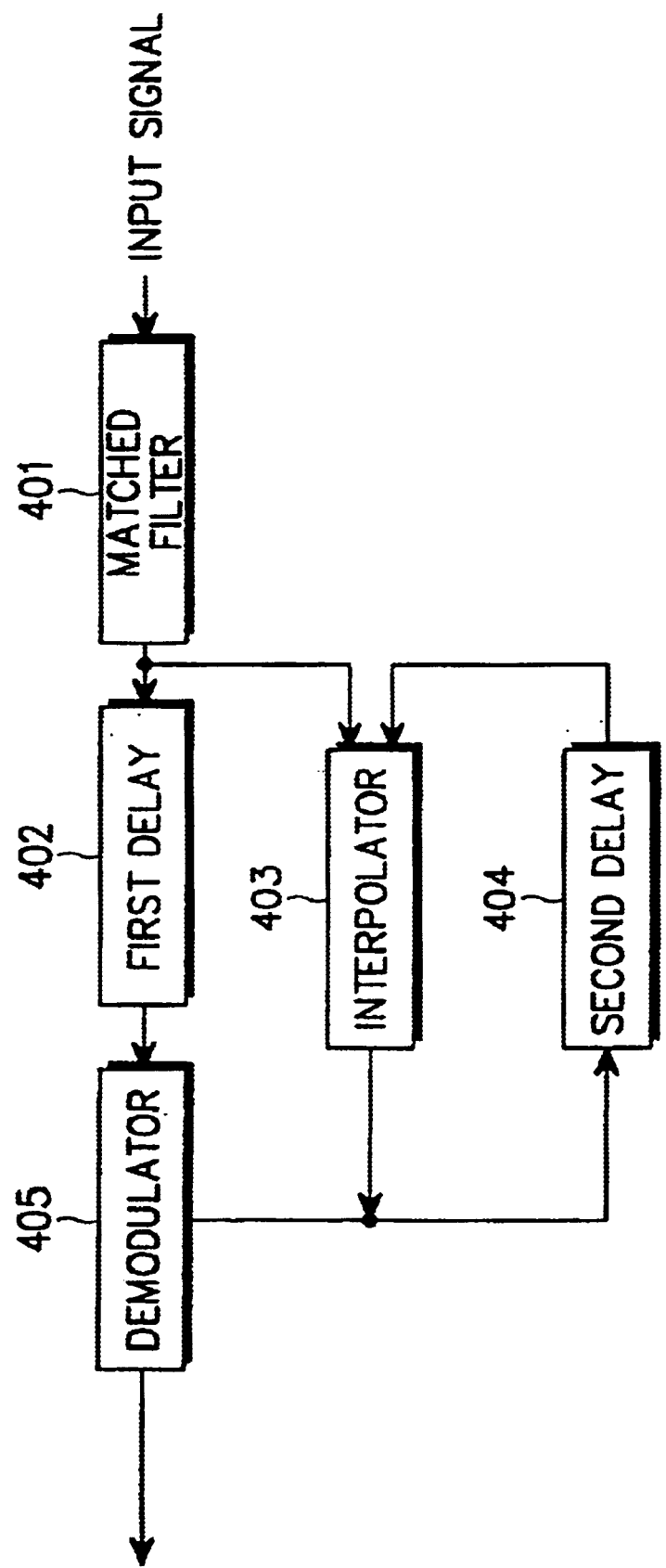
FIG. 4 is a block diagram of another conventional channel estimating apparatus relying on ESAE in a radio communication system.

A preferred embodiment of the present invention will be described herein below with reference to the accompanying drawings. In the following description, well-known functions or constructions are not described in detail since they would obscure the invention in unnecessary detail.

FIG. 6 is a block diagram of a channel estimating apparatus according to an embodiment of the present invention and FIG. 7 is a conceptual view of channel estimation for data recovery according to the embodiment of the present invention.

Referring to FIG. 6, a fading estimator 600 estimates fading using preset pilot symbols in an input signal. A first interpolator 610 interpolates information symbols based on the fading estimation. A Wiener interpolator may be used as the first interpolator 610. A first inverter 620 obtains the reciprocal number of the output of the first interpolator 610 through inverting. A first delay 630 delays an input signal for a predetermined time to provide action time to the fading estimator 600, the first interpolator 610, and the first inverter 620. A multiplier 640 primarily compensates the delayed signal received from the first delay 630 using the channel estimation signal inverted by the first inverter 620. The primary compensated signal is fed to a second interpolator 650 and a second delay 680. The second interpolator 650 is preferably a sync or Nyquist interpolator and estimates fading relating to the primarily compensated data as shown in FIG. 7.

In FIG. 7, the second interpolator 650 estimates fading relating to the primarily compensated symbols (marked with slash lines) preceding and following a data symbol S to be estimated. Pilot symbols P1, P2, P3, and P4 that were used for the primary compensation may be used along with the primarily compensated symbols for the secondary channel estimation. The same weight or different weights can be given to the primarily compensated data symbols and the pilot symbols.

Referring again to FIG. 6, a level controller 660 controls the level of the estimated value. For example, if reference symbols are (1, 0) and (−1, 0), all symbols are shifted to a (1, 0) domain by generalizing the other quadrature phase-shift keying (QPSK) symbols (0, 1) and (0, −1), for achieving the channel estimated value. A second inverter 670 inverts the level-controlled signal and a multiplier 690 secondarily compensates the delayed signal received from the second delay 680 by multiplying the delayed signal by the inverted signal received from the second inverter 670.

In accordance with the embodiment of the present invention, the channel of the symbol S is estimated through the primary estimation using pilot symbols and the secondary estimation using symbols compensated for by the Wiener interpolator 610 as new pilot symbols using the Nyquist interpolator 650.

While the Wiener interpolator 610 is used for the primary channel estimation, the Nyquist interpolator 650 is used for the secondary channel estimation because the primarily compensated symbols related thereto are located near the symbol to be estimated.

According to the channel estimation method in the embodiment of the present invention, data symbols are more accurately channel-estimated as signal to noise ratio (SNR) increases and use of compensated data symbols along with the pilot symbols increases channel estimation reliability.

FIGS. 8A to 8D illustrate BER characteristics according to the embodiment of the present invention. The horizontal axis of each of FIGS. 8A to 8D represents Es/No and the vertical axis represents BER variations. Table 1 lists experimental data.

TABLE 1

| Figure | K | fd |
|---|---|---|
| 8A | 7 dB | 20 Hz |
| 8B | 7 dB | 200 Hz |
| 8C | 12 dB | 20 Hz |
| 8D | 12 dB | 200 Hz |

As noted from FIGS. 8A to 8D, performance is improved in the embodiment of the present invention, as compared to performance in a conventional Wiener interpolator using scheme.

Figure 8A:
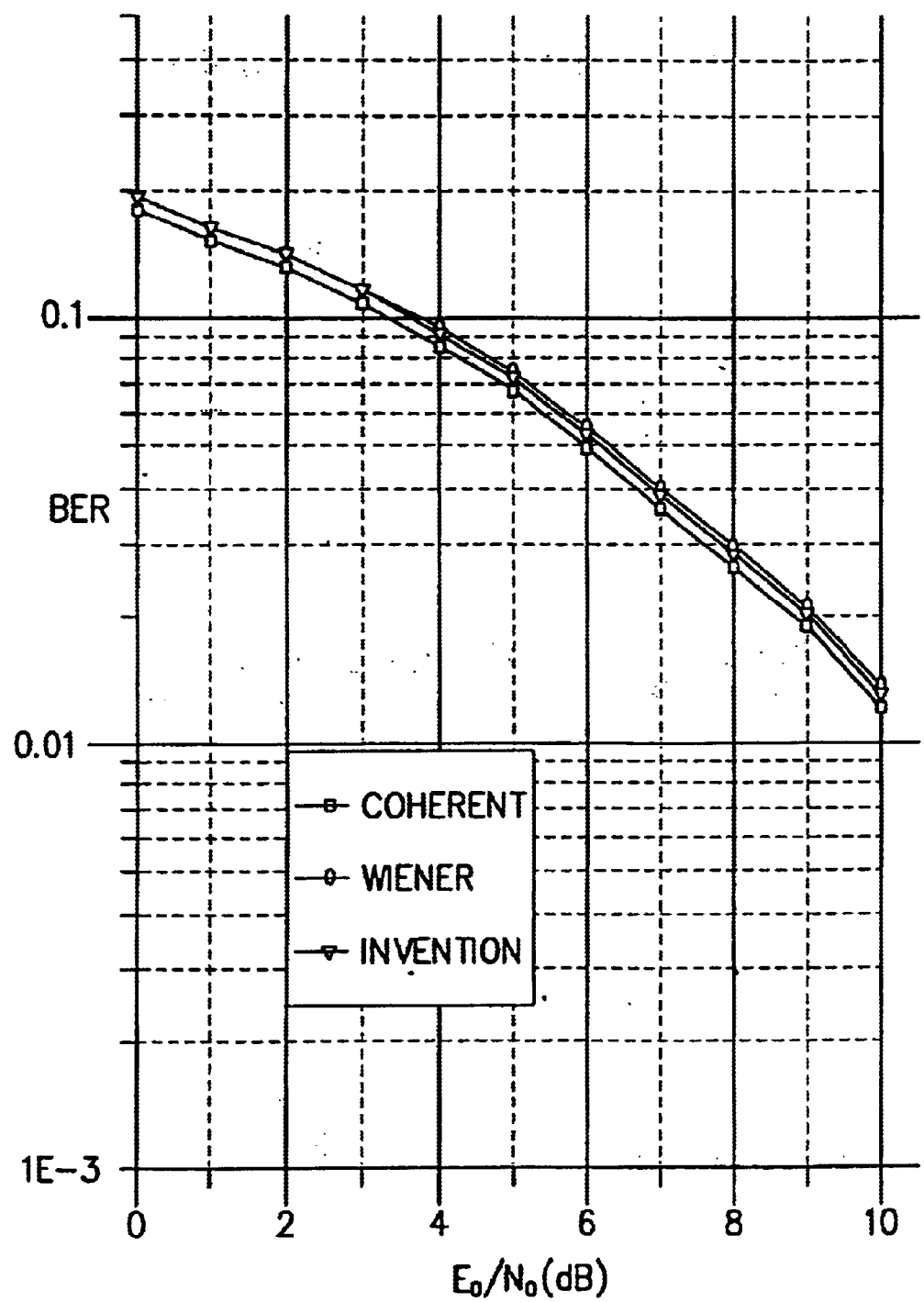
FIGS. 8A to 8D are graphs showing BER characteristics according to the embodiment of the present invention.
Figure 8B:
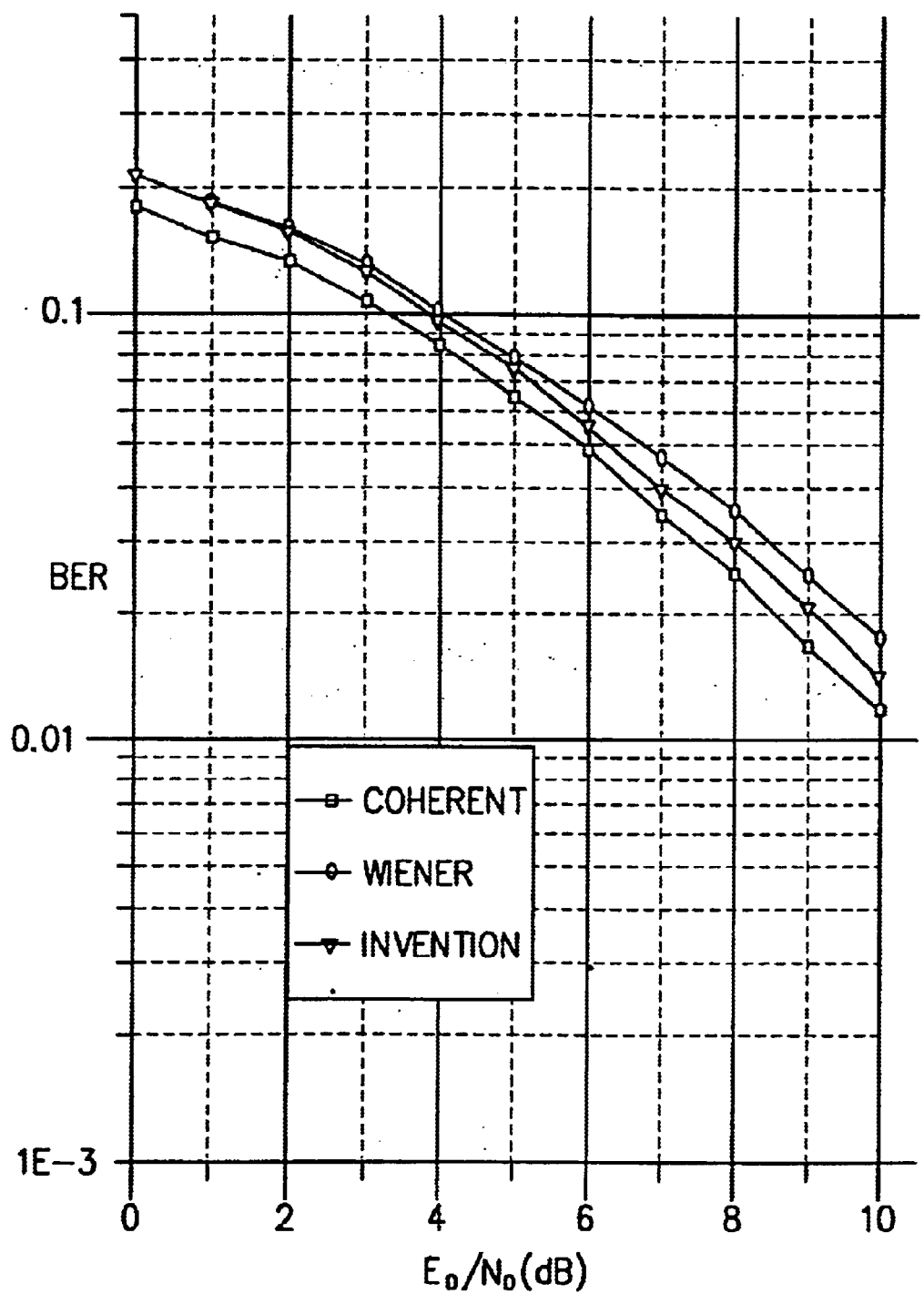
Figure 8C:
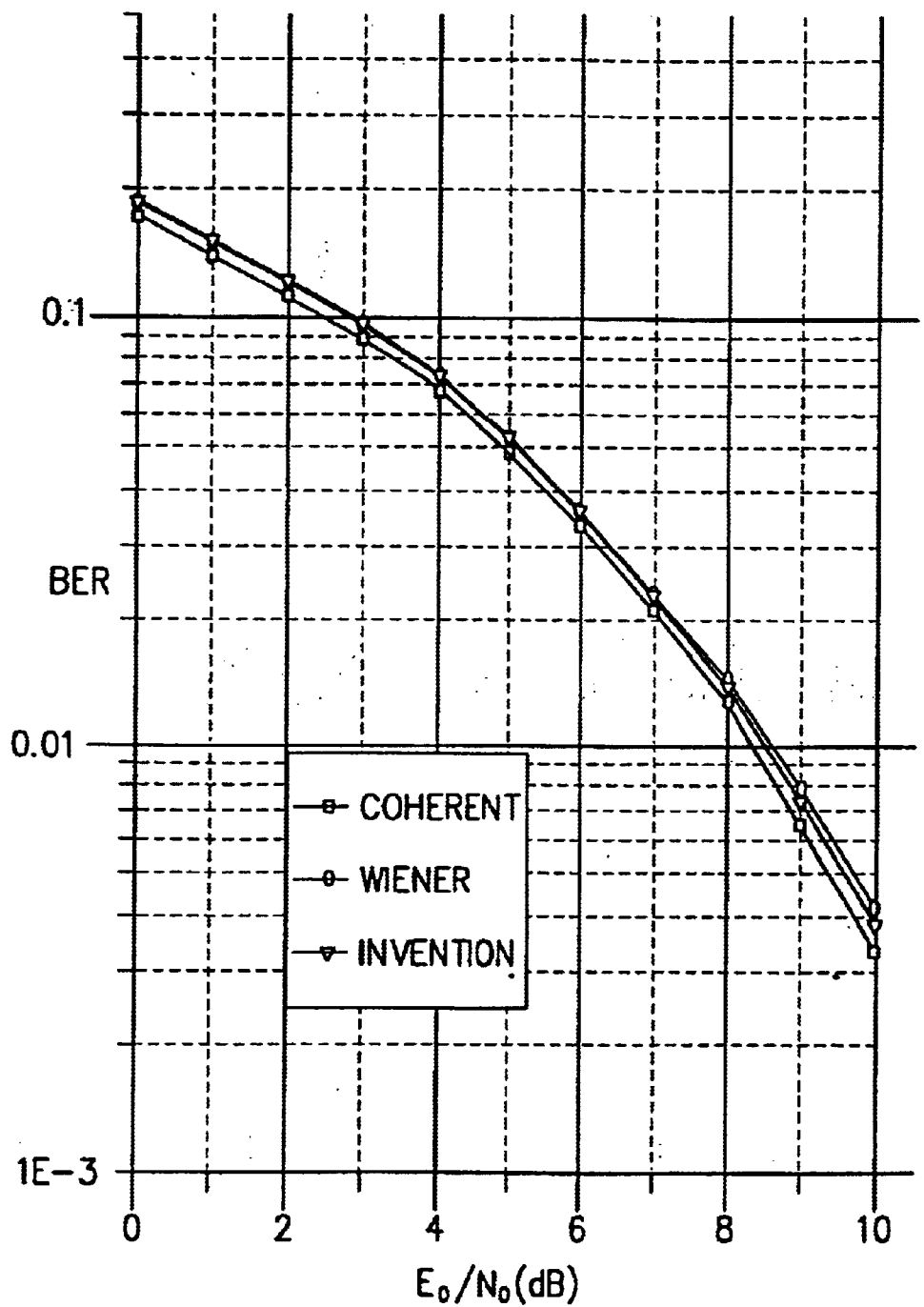
Figure 8D:
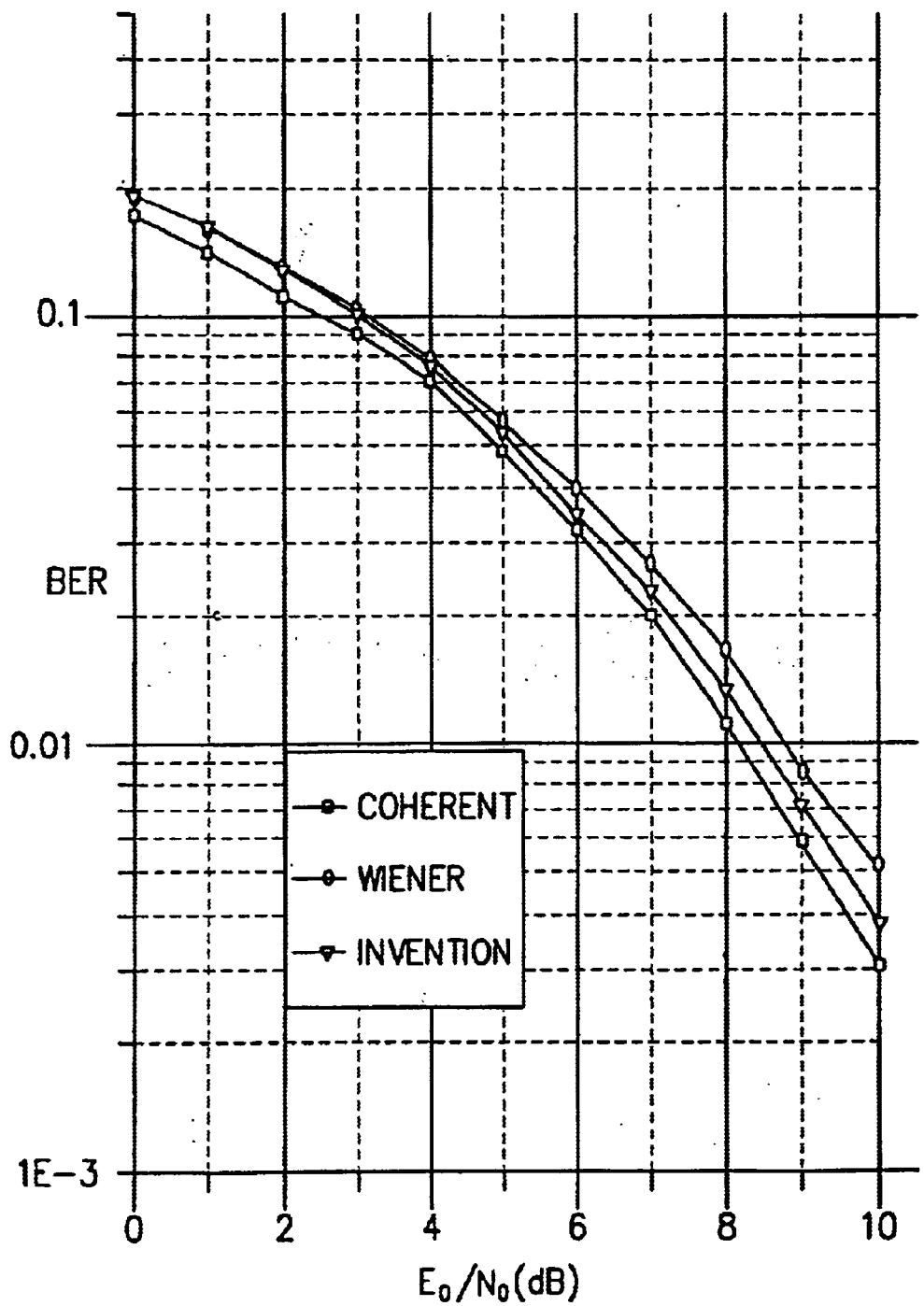

In Table 1, K denotes a Ricean fading factor and fd is a Doppler frequency. Normalized Doppler frequencies (fdT) are 0.0011 and 0.011, that is, 20 Hz and 200 Hz in the case where a symbol rate is 18,000 symbols per second. Here, a pilot insertion period M is 20. In the case of coherent demodulation, it is assumed that a receiver accurately knows required Doppler frequency and symbol energy per power spectrum density ($\gamma$=Es/No). It is concluded from simulation results that the embodiment of the present invention is superior to the conventional Wiener interpolator using scheme in case of fast fading (fdT=0.011), as shown in FIGS. 8B and 8D.

According to the present invention as described above, a channel is primarily estimated using pilot symbols and secondarily estimated using the primarily compensated symbols. Therefore, channel estimation can be performed even at severe distortion caused by fading.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A channel estimating apparatus in a radio communication system, comprising:

a fading estimator for estimating a channel using preset symbols of an input signal;

a first interpolator for interpolating other symbols of the input signal based on the fading estimation;

a first inverter for inverting an output signal of the first interpolator;

a first delay for delaying the input signal for a predetermined time;

a first multiplier for primarily compensating an output signal of the first delay by means of the output signal of the first inverter;

a second interpolator for interpolating each symbol of the input signal relating to primarily compensated symbols in a predetermined period before and after the symbol;

a level controller for controlling the level of an output signal of the second interpolator;

a second inverter for inverting an output signal of the level controller;

a second delay for delaying the primarily compensated signal for a predetermined time; and a second multiplier for secondarily compensating an output signal of the second delay by means of the output signal of the second inverter.

2. The channel estimating apparatus of claim 1, wherein the first interpolator is a Wiener interpolator.

3. The channel estimating apparatus of claim 1, wherein the second interpolator is one of a sync interpolator and a Nyquist interpolator.

4. The channel estimating apparatus of claim 2, wherein the second interpolator is one of a sync interpolator and a Nyquist interpolator.

5. The channel estimating apparatus of claim 1, wherein the preset symbols are pilot symbols.

6. The channel estimating apparatus of claim 4, wherein the preset symbols are pilot symbols.

7. A channel estimating method in a radio communication system, comprising the steps of:

primarily compensating other symbols of an input signal using preset symbols, comprising the steps of:
estimating a fading using the preset symbols;
interpolating the other symbols of the input signal based on the fading estimation and inverting the interpolated signal; and
compensating the input signal by multiplying the inverted signal by a delayed input signal; and secondarily compensating each symbol of the input signal relating to the primarily compensated symbols in a predetermined period before and after each symbol.

8. The channel estimating method of claim 7, wherein the secondarily compensating step comprises the steps of:

interpolating each symbol relating to the primarily compensated symbols in the predetermined period before and after the symbol and controlling the level of the interpolated symbols;

inverting the level-controlled signal and secondarily compensating the primarily compensated signal; and secondarily compensating the primarily compensated signal by multiplying the inverted signal by a delayed primarily-compensated signal.

9. The channel estimating method of claim 7, wherein the preset symbols are pilot symbols.

10. The channel estimating method of claim 8, wherein the preset symbols are pilot symbols.

* * * * *